United States Patent [19]
Graves

[11] 3,729,927
[45] May 1, 1973

[54] TWO-CYCLE INTERNAL COMBUSTION ENGINE

[76] Inventor: James G. Graves, 115 Lake Aluma Drive, Oklahoma City, Okla. 73121

[22] Filed: Jan. 3, 1972

[21] Appl. No.: 214,986

[52] U.S. Cl..................................................60/39.6
[51] Int. Cl.....................................................F02g 3/02
[58] Field of Search........................60/39.6, 39.62; 123/39

[56] References Cited

UNITED STATES PATENTS 2,838,034   6/1958   Clark..................................123/39

FOREIGN PATENTS OR APPLICATIONS 547,771   12/1922   France.............................60/39.6

Primary Examiner—Wendell E. Burns
Attorney—Robert K. Rhea

[57] ABSTRACT

A piston driven compressionless engine having a combination intake and combustion manifold communicating with the upper end of the cylinder through a flap valve is filled with an explosive mixture from a carburetor by the upstroke of the piston in response to the opening of a suction valve opened by a crankshaft actuated cam with the previously burned gases being discharged from the cylinder during the piston upstroke by a crankshaft operated exhaust valve.

3 Claims, 7 Drawing Figures

Patented May 1, 1973
3,729,927
2 Sheets-Sheet 1
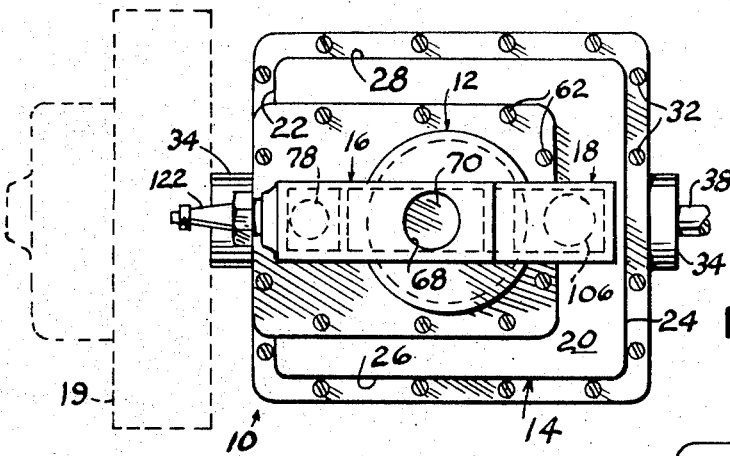
FIG. 3
FIG. 4
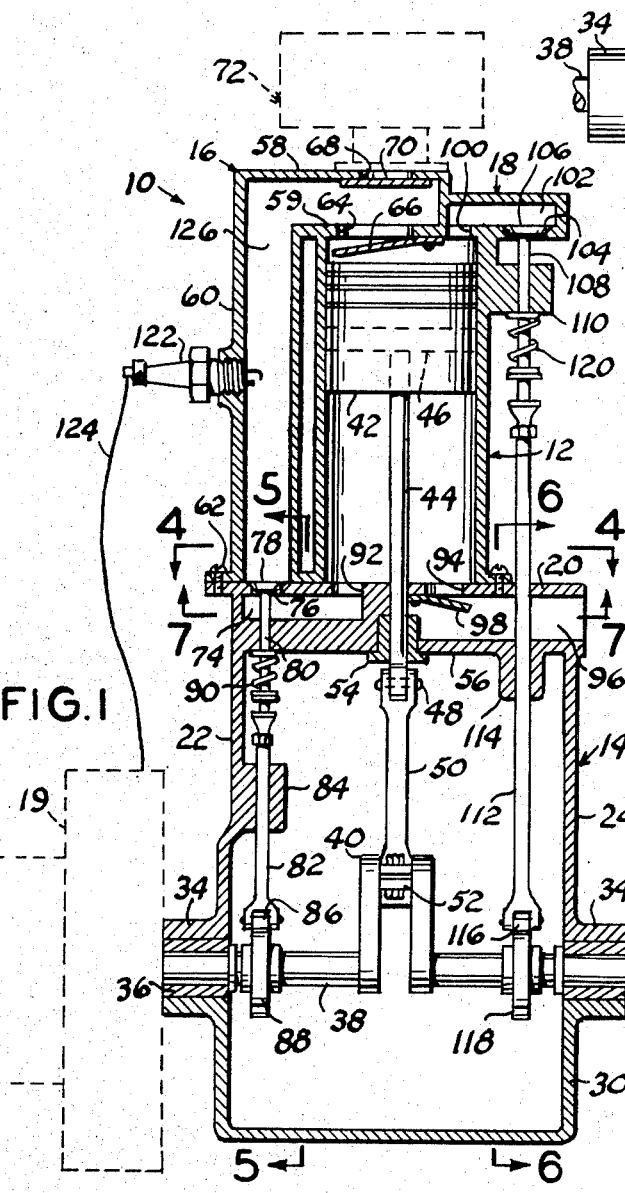
FIG. 1
FIG. 5

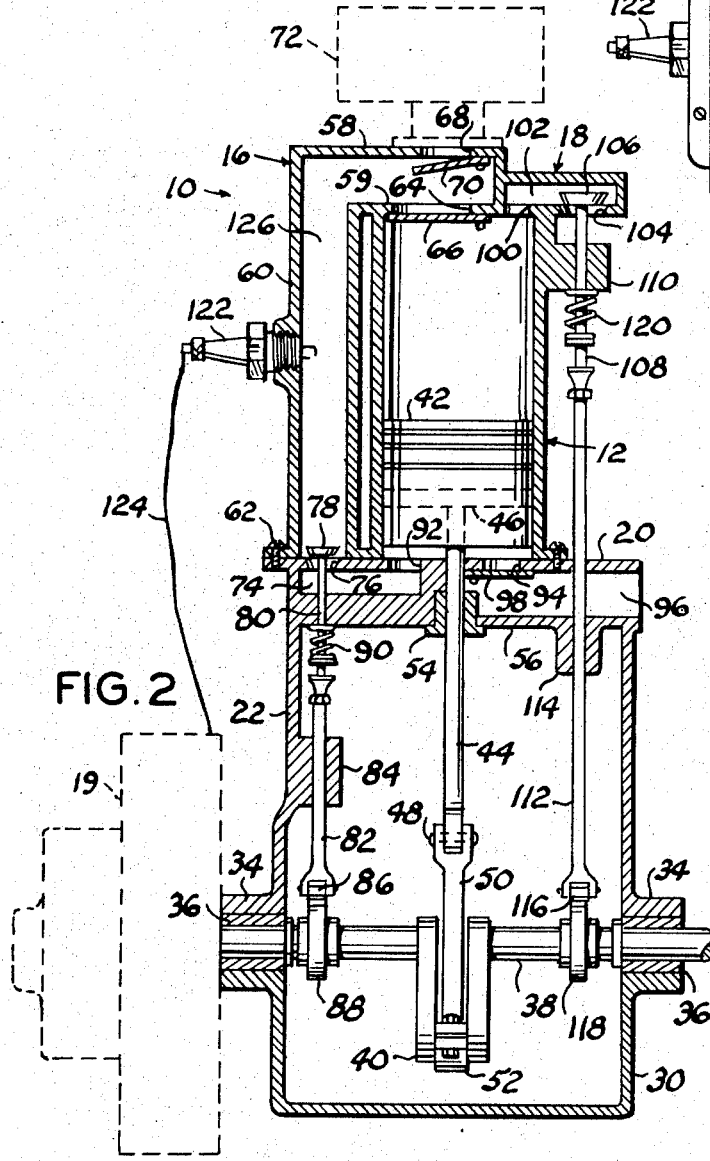
FIG. 2
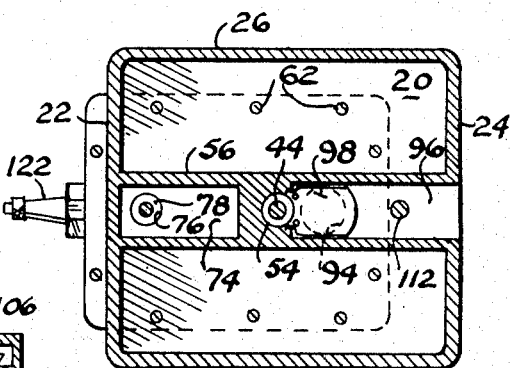
FIG. 7
FIG. 6

3,729,927

TWO-CYCLE INTERNAL COMBUSTION ENGINE

BACKGROUND OF THE INVENTION

1. Field of the Invention

The present invention relates to internal combustion engines and more particularly to a two-cycle piston driven compressionless engine.

This engine is particularly useful for powering small fishing boats, or the like, where relatively little power is required and elimination of excessive engine noise is desirable. The fuel is under atmospheric pressure and is therefore relatively low and yet its burning is sufficient to drive the engine and to slowly propel a small boat, as when plugging or trolling.

2. Description of the Prior Art

Two-cycle internal combustion engines usually include a pair of piston with one piston being used for compressing fuel and the other piston performing work as a result of burning fuel as in U.S. Pat. Nos. 1,382,539; 1,595,022 and 2,315,011.

Another type of two-cycle engine is disclosed by U.S. Pat. No. 2,499,642 which features injecting a fuel mixture, under less than atmospheric pressure, into the combustion chamber just prior to ignition. Thus, each of the patents disclosed by prior art require that the fuel mixture be compressed before ignition time or injected into a firing chamber and in those embodiments where one slave piston forms the fuel compressing action some of the work force generated by the exploding fuel is lost in the work necessary for the compression stroke.

This invention forms an engine using fuel and sufficient oxygen to form a combustible mixture under not more than one atmosphere pressure which fires at the beginning of each downstroke of the piston wherein the upward stroke of the piston exhausts burned fuel from the combustion chamber and cylinder while simultaneously drawing a clean fuel mixture into an intake combustion chamber communicating with both ends of the cylinder.

SUMMARY OF THE INVENTION

A cylinder having a closed end is connected at its other end with a crankcase journalling a crankshaft having a crank arm. A piston is reciprocated in the cylinder by a connecting rod connected with the crank arm. An L-shaped intake-combustion manifold partially overlies the closed end of the cylinder and extends longitudinally thereof. The combustion manifold is provided with a pair of valves communicating, respectively, with a carburetor and the closed end of the cylinder. A cam shaft operated cylinder suction valve provides communication between the manifold and the crankcase connected end of the cylinder. A cam operated exhaust valve exhausts the cylinder through an exhaust manifold during the upstroke of the piston. A magneto type electric energy generator is connected with a spark plug mounted on the intake-combustion manifold.

The principal object of this invention is to provide a compressionless two-cycle internal combustion engine operating from a fuel supply under one atmospheric pressure.

DESCRIPTION OF THE DRAWINGS

FIG. 1 is a vertical cross-sectional view, partially in elevation, of the engine at the beginning of the firing or downstroke of the piston and illustrating a conventional carburetor and a magneto connected therewith by dotted lines;

FIG. 2 is a view similar to FIG. 1 illustrating the piston at the beginning of its upstroke;

FIG. 3 is a top view of FIG. 1;

FIG. 4 is a horizontal cross-sectional view, partially in elevation, taken substantially along the line 4—4 of FIG. 1;

FIGS. 5 and 6 are fragmentary vertical cross-sectional views, partially in elevation, taken substantially along the lines 5—5 and 6—6 of FIG. 1; and, FIG. 7 is a horizontal cross-sectional view, partially in elevation, taken substantially along the line 7—7 of FIG. 1.

DESCRIPTION OF THE PREFERRED EMBODIMENT

Like character of reference designate like parts in those figures of the drawings in which they occur.

In the drawings:

The reference numeral 10 indicates the engine, as a whole, comprising a cylinder 12, a crankcase 14, an intake-combustion manifold 16, exhaust manifold 18 and magneto-starter 19. The crankcase is formed by a top wall 20 joined to end walls 22, 24 and side walls 26 and 28. The crankcase further includes an oil pan 30 joined to the depending flanged limit of the crankcase walls by bolts or screws 32. The end walls 22 and 24 of the crankcase and oil pan cooperatively form a pair of centrally drilled bearing supports 34 which respectively hold a pair of bearings 36 journalling respective end portions of a crankshaft 38. The crankshaft is provided with a crank arm 40. A substantially conventional piston 42 reciprocates in the cylinder 12 and includes a two-part piston rod having its upper and or shaft portion 44, as viewed in the drawings, secured at one end to a wrist pin 46 and its depending end portion pivotally connected by a pin 48 to one end of the lower or rod portion 50 in turn connected in a conventional manner by a piston rod bearing 52 to the crank arm 40. The depending end portion of the shaft 44 is slideably supported longitudinally by a sleeve bearing 54 mounted in an enlarged elongated lug 56 depending from the crankcase upper wall 20 and extending between the crankcase end walls 22 and 24.

The intake-combustion manifold 16 is substantially inverted L-shaped, as viewed in FIGS. 1 and 2, and is substantially square in transverse section, as clearly shown in FIG. 4. The manifold foot portion 58 diametrically overlies a portion of and is preferably integrally formed with the upper end wall 59 of the cylinder with the manifold leg portion 60 extending longitudinally coextensive with the cylinder 12. The end of the manifold leg portion 60 and cylinder 12 are provided with flanges which are secured to the upper surface of the crankcase top wall 20 by bolts or screws 62. The cylinder end wall 59 is provided with a combustion inlet port 64 providing communication between the intake-combustion manifold and the cylinder 12 above the piston. The inlet port 64 is opened and closed by a flap vale commonly referred to as a reed vale 66, as hereinafter explained.

The wall of the foot portion 58, opposite the inlet port 64, is provided with a fuel intake opening 68 similarly opened and closed by a reed vale 70 in the manner presently explained. A substantially conventional carburetor 72 has its throat secured to the manifold foot portion 58 around its fuel intake opening 68. The carburetor, connected with a source of fuel, not shown, supplies a combustible mixture to the manifold 16 during each upstroke of the piston 42 in the manner presently explained.

The crankcase lug 56 is provided with a first chamber 74. A cylinder suction port 76 is formed in the crankcase top wall 20 to provide communication between the first chamber 74 and end of the intake-combustion manifold leg 60 at its end opposite its foot portion 58. A suction vale 78 is seated on the seat formed by the cylinder suction port 76 with the stem 80 of this vale projecting through the crankcase lug 56 toward the crankshaft. A push rod 82, slidably journalled by a support 84 formed on the inner surface of the end wall 22, contacts the depending end of the suction vale stem 80, at one end, and is provided with a roller bearing 86 at its depending end which contacts a peripheral portion of a suction vale cam or disk 88 surrounding one end portion of the crankshaft 38. A valve spring 90 normally urges the suction vale 78 toward a closed position and maintains the push rod roller 86 in contact with the cam 88. The crankcase top wall 20 is provided with a cylinder suction opening 92 to provide communication between the first lug chamber 74 and depending end portion of the cylinder 12. The end wall 20 is further apertured to form a cylinder discharge opening 94 providing communication between the depending end of the cylinder and a second chamber 96 formed in the lug 56 and open to the atmosphere. The cylinder discharge opening 94 is opened and closed by a reed vale 98.

The exhaust manifold 18, preferably rectangular in cross section, is formed with one end wall and one side wall integral with the adjacent end of the intake-combustion manifold lug 58 and the closed end of the cylinder respectively, and projects laterally of the axis of the latter in alignment with the manifold foot portion 58. An aperture 100, formed in the cylinder end wall provides communication between the exhaust manifold chamber 102 and the upper end of the cylinder 12. The exhaust manifold is provided with an exhaust port 104 opened and closed by an exhaust vale 106 having a stem 108 slidably supported by a lug 110 formed on the outer wall surface of the cylinder. An exhaust push rod 112 is slidably journalled by an apertured boss 114 formed in depending relation on the lug 56. The push rod 112 contacts the depending end of the exhaust valve stem 108 and is similarly provided with a roller 116 at its depending end which contacts an exhaust valve cam or disk 118 surrounding an end portion of the crankshaft 38. A spring 120, surrounding the exhaust valve stem 108, urges the exhaust valve toward a closed position to maintain the push rod roller 116 in contact with the cam 118.

The magneto-starter is conventional being coaxially connected with the crankshaft 38. A spark plug 122, mounted on the intake-combustion manifold 16, is fired by the magneto by a wire 124. The magneto also serves as a flywheel.

OPERATION

In operation the engine components, as shown in FIG. 1, are in position for the beginning of the firing or downstroke of the piston. The crank arm 40 has moved one or two degrees beyond upper dead center of the piston. The spark plug has fired the fuel charge in the intake-combustion chamber 126, which generates pressure by its burning, opening the reed valve 66 and forcing the piston 42 downwardly. During the downstroke of the piston, residual gases, within the depending end portion of the cylinder 12, are discharged to the atmosphere through the discharge opening 94 and second lug chamber 96.

FIG. 2 illustrates the piston in substantially its lowermost position wherein the crank arm 40 has moved one or two degrees beyond bottom dead center of the piston so that the cams 88 and 118 have respectively opened the manifold suction vale 78 and exhaust vale 106. Upward movement of the piston 42 close the reed vales 66 and 98, reducing the pressure within the depending end portion of the cylinder and combustion manifold chamber 126, which opens the fuel intake valve 70 and draws fresh fuel from the carburetor 72 into the intake-combustion chamber 126 and generates a flow of residual burned gases out of the intake combustion chamber 126 through the suction port 76, first lug chamber 74 and into the depending end portion of the cylinder through the cylinder suction opening 92. Simultaneously, the burned gases, in the upper end portion of the cylinder, are exhausted by the piston through the cylinder end wall aperture 100, to the exhaust manifold chamber 102 and to the atmosphere through the exhaust valve port 104. When the piston reaches top dead center and the crank arm moves one or two degrees thereabove, the cams 88 and 118 respectively close the cylinder suction valve 78 and exhaust valve 106 to repeat the cycle.

Obviously the invention is susceptible to changes or alterations without defeating its practicability, therefore, I do not wish to be confined to the preferred embodiment shown in the drawings and described herein.

I claim:

1. A two-cycle internal combustion engine, comprising:

a crankcase having a top wall and having opposing end walls;

a crankshaft including a crank arm journalled by said crankcase end wall;

a cylinder mounted on said crankcase,
      said cylinder having an end wall opposite said crankcase,
      said cylinder end wall having a combustion inlet port and having a cylinder exhaust aperture;

a piston reciprocable within said cylinder rod means connecting said piston with said crank arm;

a combustion manifold overlying the combustion inlet port of said cylinder end wall and extending longitudinally coextensive with said cylinder the crankcase top wall having a cylinder suction port communicating with said combustion manifold and having a cylinder suction opening and a cylinder discharge opening communicating with the end of said cylinder opposite its end wall;

an exhaust manifold overlying the cylinder end wall exhaust aperture,
said exhaust manifold having an exhaust port;
a coextensive lug formed on the depending surface of the crankcase top wall,
said lug having a first chamber formed therein providing communication between the cylinder suction port and the cylinder suction opening,
said lug having a second chamber providing communication between the cylinder discharge opening and the atmosphere,
said combustion manifold having a fuel intake opening; a like plurality of flap vale means respectively opening and closing the fuel intake opening, the combustion inlet port and the cylinder discharge opening;
a suction vale opening and closing the crankcase end wall cylinder suction port;
an exhaust valve opening and closing the exhaust manifold exhaust port; and,
cam means connected with said crankshaft and operatively connected with said suction valve and said exhaust valve.

2. The engine according to claim 1 in which said rod means includes:

a shaft portion coaxially connected at one end with said piston and projecting at its other end portion through said crankcase top wall;
a sleeve bearing in said top wall longitudinally slidably supporting said shaft;
a piston rod pivotally connected in longitudinal alignable relation at one end to the end of said shaft opposite said piston; and,
a piston rod bearing secured to the other end of said piston rod.

3. The engine according to claim 2 in which said suction valve and said exhaust valve are each provided with a valve stem having a free end portion projecting toward said crankshaft and said cam means includes:

a disk eccentrically surrounding an intermediate portion of said crankshaft on opposing sides of said crank arm;
a push rod extending between each said disk and the free end of said valve stems, respectively;
a roller journalled by the respective end portion of said push rods adjacent the respective said disk; and,
spring means urging said suction valve and said exhaust valve toward a closed position.

* * * * *